Nov. 15, 1927.

J. W. WELSH 1,649,793

OPHTHALMIC MOUNTING

Original Filed Aug. 21, 1922

Inventor
James W. Welsh
by David Rines
Attorney

Patented Nov. 15, 1927.

1,649,793

UNITED STATES PATENT OFFICE.

JAMES W. WELSH, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Original application filed August 21, 1922, Serial No. 583,203. Divided and this application filed October 7, 1924. Serial No. 742,196.

The present invention relates to ophthalmic mountings, particularly mountings of the non-metal type. The present application is a division of a copending application, Serial No. 583,203, filed August 21, 1922.

The chief object of the invention is to improve upon present-day hinge connections between the fronts and the temples of ophthalmic mountings of the above-described character. Other objects will appear hereinafter.

Figure 1:
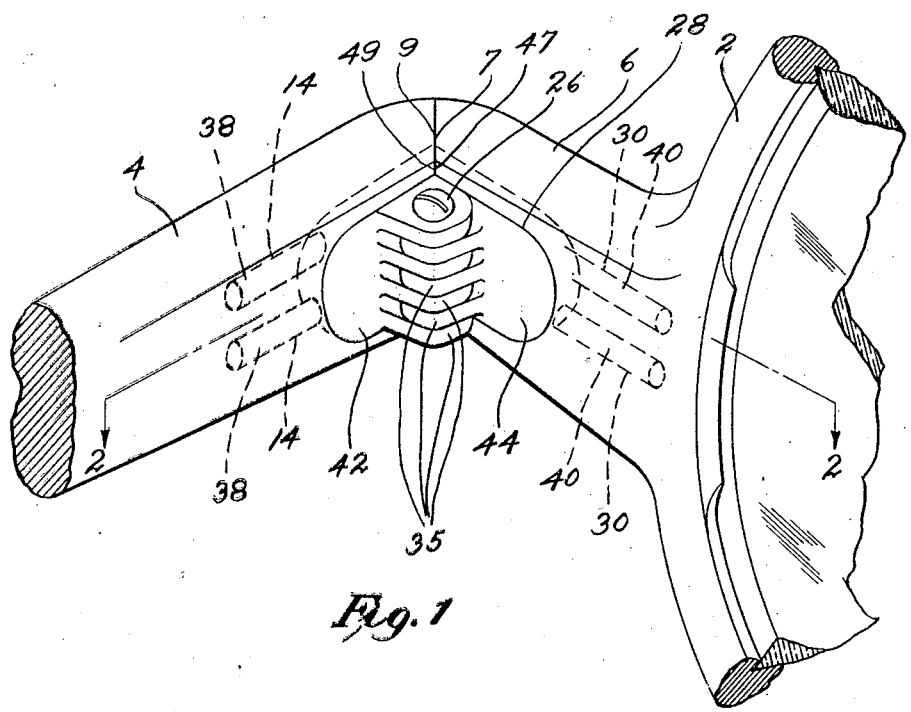
Figure 2:
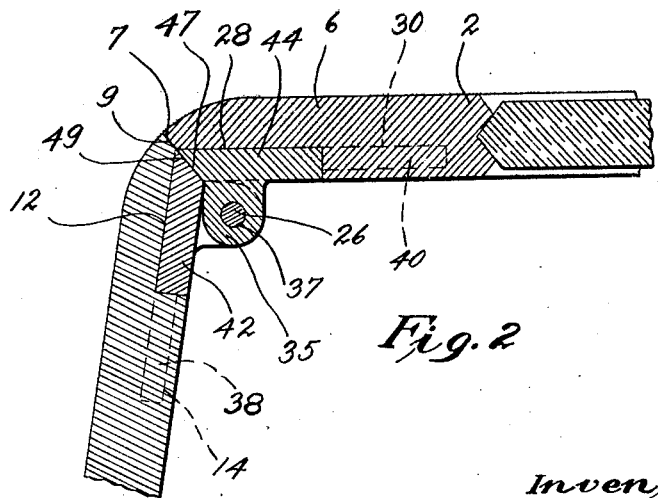

In the accompanying drawings, Fig. 1 is a fragmentary perspective view of an ophthalmic mounting constructed according to a preferred embodiment of the present invention; and Fig. 2 is a section taken as upon the line 2—2 of Fig. 1, looking in the direction of the arrows.

Non-metal mountings of the character illustrated in the present invention are usually constituted of a non-metal front 2 and non-metal temples 4. The temples are hinged at their forward ends to non-metal extensions or end pieces 6 of the front 2. The end portions of the end pieces 6 are beveled at 7.

The preferred temple is provided with a recess 12 and one or more longitudinal bores 14 leading into the recess 12. A hinge element is mounted on the temple, comprising a hinge plate 42 seated in the recess 12 and one or more rods 38 mounted in the bores 14. The hinge element is thus embedded in the temple. The end portion of the temple is beveled at 9.

The end piece 6 of the front 4 is similarly provided with a recess 28. A similar hinge element has a hinge plate 44 seated in the recess 28 and one or more rods 40 seated in one or more bores 30 that lead into the recess 28. The rods 38 and 40 are integral with the respective hinge plates 42 and 44, thus causing the hinge elements to become embedded in the temple and the end piece respectively.

The hinge plates 42 and 44 are provided with knuckles 35 having openings 37 that are out of the general planes of the hinge elements, providing for a butt joint. A screw 26 pivotally connects the hinge plates 42 and 44 together. When the temple is swung about the screw 26 to its limit of pivotal movement, the beveled portions 7 and 9 will be caused to abut. The hinge plates 42 and 44 are similarly provided with beveled portions 47 and 49, respectively, that are adapted to abut, when the beveled portions 7 and 9 abut in the limiting position of swinging movement of the temple.

A mounting constructed in accordance with the present invention is most efficient, the parts being nicely adjusted, and it is of pleasing appearance, no metal parts being visible when the mounting is viewed from the front.

Modifications will readily occur to persons skilled in the art, and all such are considered to be within the spirit and scope of the invention, as defined in the appended claims.

What is claimed is:

1. An ophthalmic mounting comprising a non-metal mounting having a recess and a plurality of bores leading into the recess, and a hinge element comprising a hinge plate seated in the recess and a plurality of rods in the bores.

2. An ophthalmic mounting having a recess and a plurality of bores leading into the recess, and a hinge plate seated in the recess having a plurality of rods in the bores.

In testimony whereof, I have hereunto subscribed my name this 30th day of September, 1924.

JAMES W. WELSH.